United States Patent [19]

Tarala

[11] E Patent Number: Re. 32,851

[45] Reissued Date of Patent: Jan. 31, 1989

[54] FLUID FILTER

[75] Inventor: Frederick E. Tarala, Pittsford, N.Y.

[73] Assignee: North American Filter Corporation, Newark, N.Y.

[21] Appl. No.: 163,633

[22] Filed: Mar. 3, 1988

Related U.S. Patent Documents

Reissue of:

[64] Patent No.: 4,615,803
Issued: Oct. 7, 1986
Appl. No.: 666,503
Filed: Oct. 30, 1984

[51] Int. Cl.[4] ..... B01D 27/04; B01D 27/06

[52] U.S. Cl. ..... 210/455; 210/457; 210/487; 55/497; 55/500

[58] Field of Search ..... 210/455, 457, 487, 232, 210/322, 323.1, 330, 331, 345, 346, 347, 450, 451, 461, 486; 55/497, 500, 492, 498, 521, 529

[56] References Cited

U.S. PATENT DOCUMENTS

| | | | |
|---|---|---|---|
| 1,738,114 | 12/1929 | Olson | 210/346 |
| 1,909,308 | 5/1933 | Nugent | 210/347 |
| 1,918,980 | 7/1933 | Nugent | 210/345 |
| 1,989,306 | 1/1935 | Beatty | 210/345 |
| 3,056,504 | 10/1962 | LaVallée | 210/346 |
| 3,202,284 | 8/1965 | Wade | 210/345 |
| 3,486,626 | 12/1969 | Close | 210/232 |
| 3,522,886 | 8/1970 | Edmiston et al. | 210/345 |
| 3,633,753 | 1/1972 | Petitjean | 210/457 |
| 3,633,757 | 1/1972 | Moderne | 210/457 |

*Primary Examiner*—Richard V. Fisher
*Assistant Examiner*—Wanda L. Millard
*Attorney, Agent, or Firm*—Cumpston & Shaw

[57] ABSTRACT

An improved fluid filter element and a filter medium therefor include a rigid core having a coupling member attached at each end for absorbing axial stress. A filter medium includes a plurality of pockets and first and second neck portions sealingly attached to said coupling member.

13 Claims, 6 Drawing Sheets

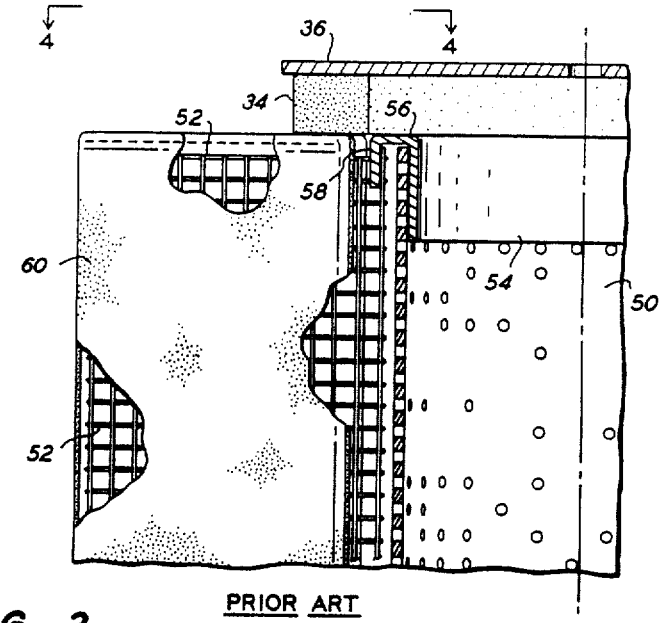
FIG. 2
PRIOR ART
FIG. 3
PRIOR ART
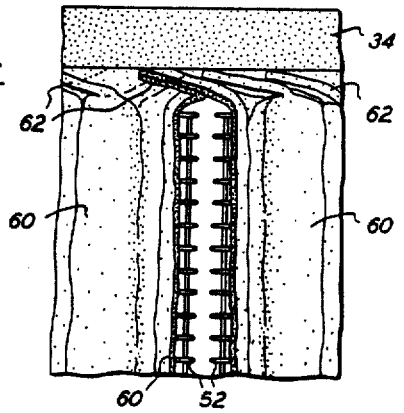

FIG. 5
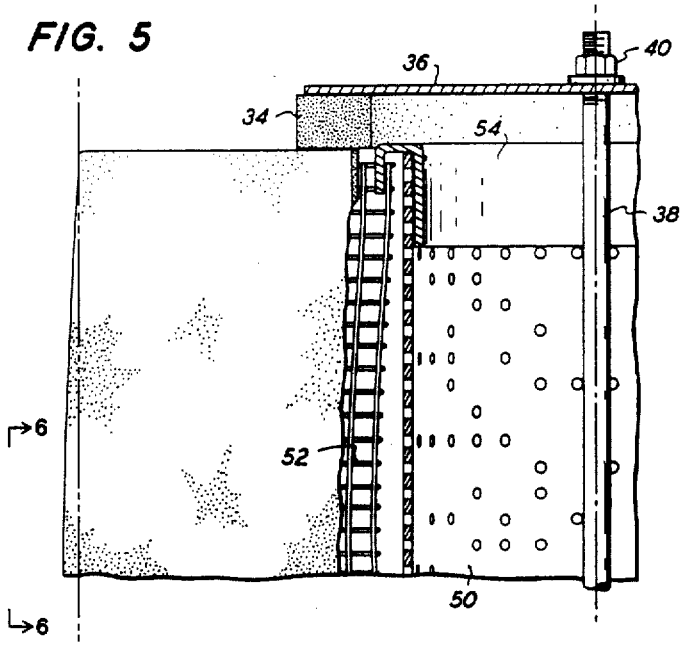
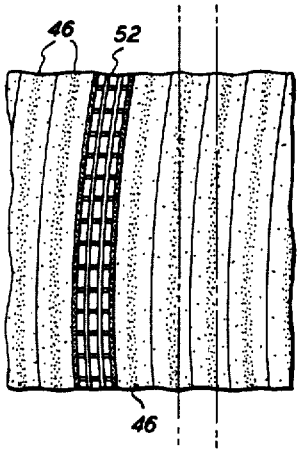
FIG. 6

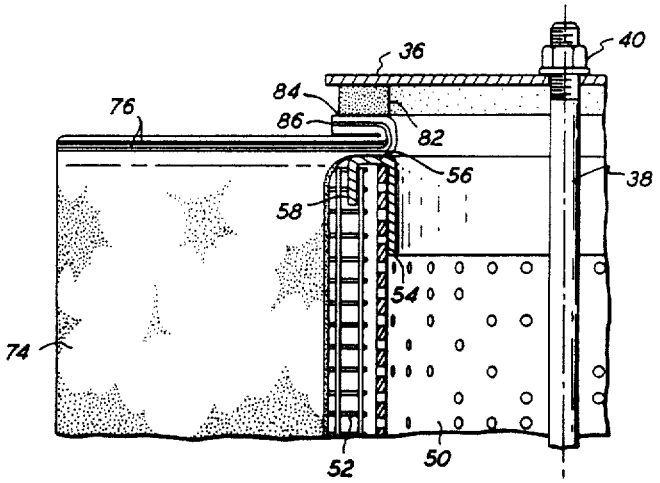
FIG. 9
FIG. 8
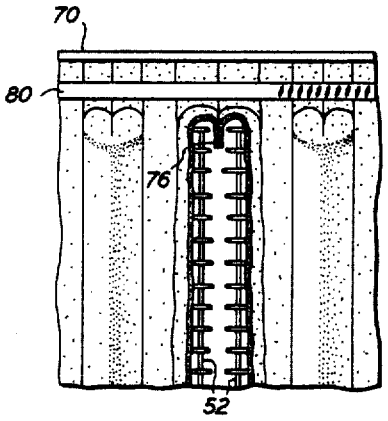

FLUID FILTER

Matter enclosed in heavy brackets [ ] appears in the original patent but forms no part of this reissue specification; matter printed in italics indicates the additions made by reissue.

This invention relates in general to fluid filters and more particularly to an improved construction for filters of the type having removable filter elements and cleanable or replaceable filter media.

Fluid filters, including filters for liquids and gases, are in widespread use. It is an advantage in such filters to provide a filter medium that is supported in use in a manner substantially eliminating leaks and which permits removal for cleaning or replacement as required. In the past, providing a substantially leak-free removable filter medium has been difficult. The point at which the filter medium is attached to the supporting structure therefor has been particularly susceptible to leakage. Time-consuming and expensive manufacturing operations have been brought to bear on this problem, including utilization of multiple forms of attachment of the filter medium, such as sewing, gluing, fabric welding and the like.

It has been another problem with filter constructions heretofore known that when such filters were installed in a housing, the formation of a leak-proof seal between the filter element and the remaining elements of the filtration system has tended to reduce the efficiency of the filter. Particularly, where such filters have utilized gaskets in a pressure seal, the force necessary to create an effective leak-proof seal to the gasket has, due to the construction of the filters, caused deformation of the filter-medium supporting frame and reduced the efficiency of the filters.

Exemplary filters in accordance with the prior art are shown in U.S. Pat. Nos. 1,218,848; 2,420,414; 3,486,626; 3,633,753 and 3,633,757. Additionally, still more recent constructions are known and will be illustrated in the accompanying drawings.

It is an object of this invention to provide a fluid filter that eliminates a potential leakage path that was present in prior art filters.

It is another object of this invention to provide a fluid filter having a removable filter medium adapted for field removal, cleaning and replacement.

It is another object of this invention to provide a fluid filter having improved fluid flow characteristics and reduced pressure drop compared with prior art filters.

It is still another object of this invention to provide a fluid filter having improved structural rigidity.

Briefly stated and in accordance with a presently preferred embodiment of this invention, a fluid filter includes a substantially rigid perforated core and a supporting frame having a plurality of radial leaves extending outwardly from said core. A coupling member extends axially outwardly from and is supported by the core and includes a collar and a radially extending flange. A filter medium having a neck portion and a plurality of pockets is mounted on said radially-extending leaves with one leaf extending into each pocket and the neck portion attached to the cylindrical collar portion of the coupling member with a clamp. The radially-extending flange is adapted to receive a gasket for providing a seal to the filter element.

In accordance with another embodiment of this invention, the cylindrical neck portion of the filter medium is folded back over itself and a sealing washer is adhesively secured to the inside surface of the neck portion of the filter medium.

While the aspects of the invention that are regarded novel are described with particularity in the appended claims, the invention itself, together with further advantages and features thereof, may be more readily understood by reference to the following detailed description taken in connection with the accompanying drawings in which:

FIG. 2 is a fragmentary side elevational view, partly in section, of a filter element in accordance with the prior art;

FIG. 3 is a side view in partial section of the filter assembly of FIG. 2;

FIG. 5 is a fragmentary side elevational view of the filter element of FIG. 2 showing deformation in use;

FIG. 6 is another view of the filter element of FIG. 5;

FIG. 8 is a partial side elevational view of a further embodiment of this invention; and FIG. 9 is a partial side elevational view of still another embodiment of this invention.

Figure 1:
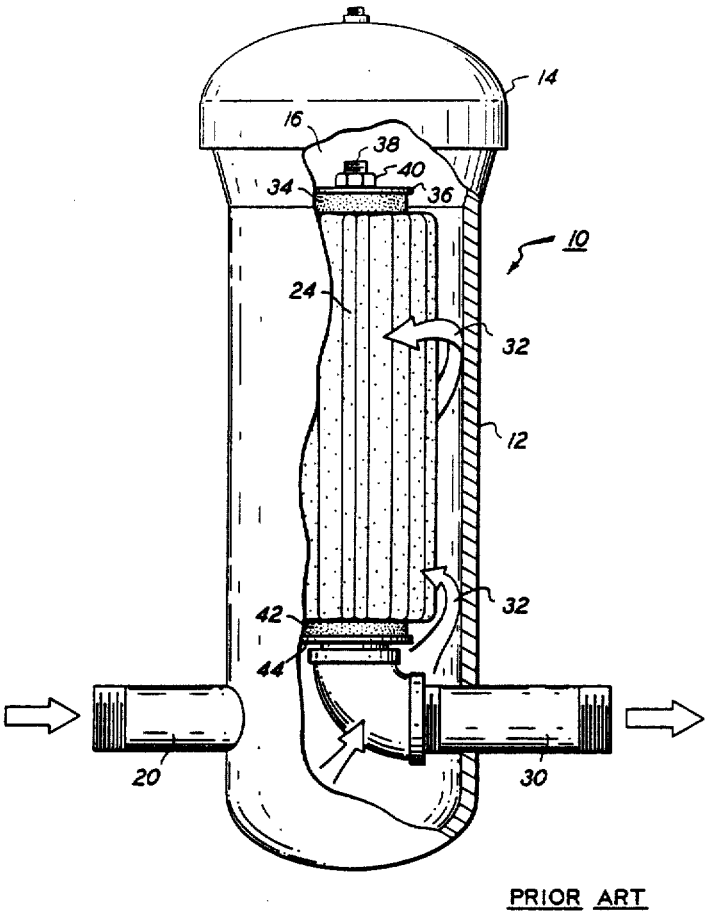
FIG. 1 is a cut-away view of a filter assembly of the type in which a filter element in accordance with this invention may be used.

Turning now to FIG. 1, a filter assembly 10 in accordance with the prior art is illustrated having a housing including a hollow tubular body 12 and an end cap 14 forming a sealed inner chamber 16. An inlet pipe 20 passes through housing 10 and communicates with chamber 16. A filter element 24 is disposed within chamber 16. Filter element 24 is adapted to pass the filtrate through a filter medium and out an exit pipe 30. The direction of fluid flow is shown generally by arrows 32.

Conventionally, filter element 24 is sealed at one end by a gasket 34 and a sealing plate 36, which are held in position by any convenient means, such as nut and bolt 38 and 40 that extend axially through the filter element. A similar gasket 42 and plate 44, preferably threaded to receive outlet pipe 30, are employed at the opposite end of filter element 24.

Further details of the construction of a removable filter element 24 in accordance with the prior art may be seen by referring now to FIG. 2. In this and the remaining figures, like and corresponding elements are designated by like reference numerals.

Figure 4:
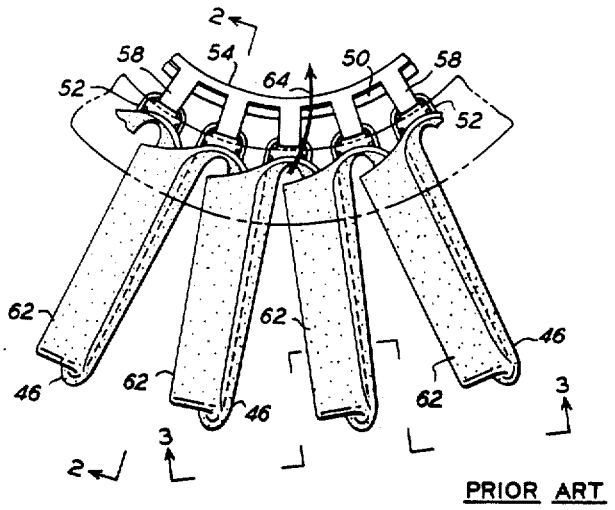
FIG. 4 is a fragmentary plan view of the filter element of FIG. 2.

FIG. 2 is a side elevational view of a portion of filter element 24 showing parts thereof in section. Filter element 24 comprises a generally cylindrical hollow core 50 and a filter medium supporting frame 52 that comprises a web of preferably resilient lattice material, such as a wire lattice formed into a circular array of outwardly extending leaves. Frame 52 is attached to core 50 by generally U-shaped attaching bracket 54 that has a cylindrical inner portion engaging the inner surface of core 50, an outwardly extending flange 56 transversing the end of core 50 and a plurality of fingers 58 engaging inner bights of the filter medium supporting frame 52 between adjacent leaves. Reference may also be made to FIG. 4 in which this structure is shown in top view.

A filter medium 60 is carried by supporting frame 52. Preferably, filter medium 60 is made of a material capable of passing the filtrate while blocking the passage of impurities. Woven and nonwoven sheets of fiber, both natural and artificial, are known to provide this function. Conventionally, filter medium 60 is formed from a sheet of filter material sewn to provide a plurality of pockets therein, each pocket carried by one leaf of the supporting frame.

A side elevational view, partly in section, of three adjacent leaves of supporting frame 52 showing filter medium 60 thereon, is illustrated at FIG. 3. A top view of this same structure appears at FIG. 4. Reference to FIGS. 2–4 reveals that the filter medium is formed into a serpentine arrangement and pockets are formed by fastening adjacent portions together along the top and bottom edges, for example by stitching, welding or the like. The top of each pocket is folded over to provide a surface for attaching a gasket 34. Typically, gasket 34 is attached to the surface formed by folded-over upper portions 62 of filter medium 60 by gluing, sewing or the like to provide a seal between the gasket and the filter medium.

Reference to FIGS. 2–4 reveals a number of problems associated with prior art filter constructions. While folded-over upper portions or flaps 62 have been required to provide a sealing surface for attaching gasket 34, these flaps impair the flow of filtrate through the filter element by closing off the upper and lower portions of the spaces between adjacent pockets of filter medium. As such, increased pressure drops have been produced by prior art filters utilizing this construction.

Additionally, this prior art construction is particularly susceptible to leakage as may be most readily seen in FIG. 4 where arrow 64 shows a path along which leakage commonly occurs. Leakage at this point is almost impossible to avoid because of the fold naturally formed in the top edge of the filter medium when flaps 62 are bent over to form the sealing surface.

A still further disadvantage of the prior art construction may be appreciated by referring now to FIG. 5. Since gasket 34 is sealed to flaps 62 by gluing or sewing as heretofore described, and to plate 36 by pressure, pressure is exerted on supporting frame 52 when the filter element is installed in the housing. Deformation of frame 52 results from the pressure exerted on the filter element by plate 36 when the element is placed under pressure to form a seal to gasket 34. As seen in FIGS. 5 and 6, such deformation causes supporting frame 52 to deflect outwardly from core 50 and adjacent leaves of the frame to deflect towards each other thereby reducing the interleaf space, impeding the flow of filtrate and increasing the pressure drop across the filter. In some cases, pressure on frame 52 was sufficient to depress the upper edge of the frame out of engagement with fingers 58 whereupon the filter would partially disassemble and be rendered ineffective.

Figure 7:
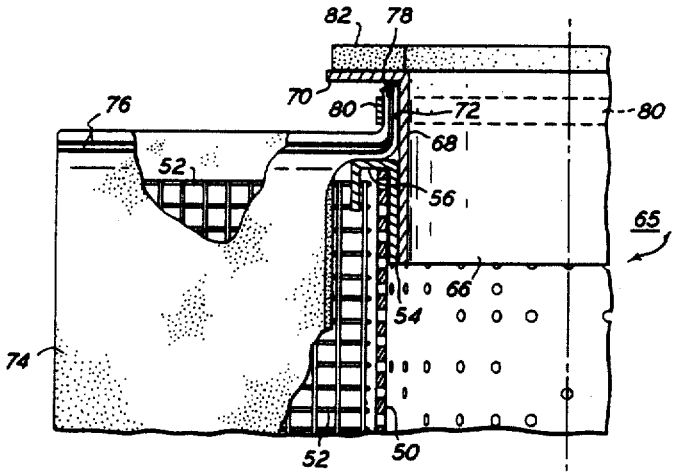
FIG. 7 is a fragmentary side elevational view, partly in section, of a filter element in accordance with this invention.

These and other disadvantages of prior art filter constructions are eliminated by Applicant's new filter shown in FIGS. 7–9. FIG. 7 is a fragmentary side elevational view, partly in section, of a filter in accordance with this invention. The filter element designated generally at 65 includes a cylindrical perforated core 50 of conventional design. A supporting frame 52 is positioned around core 50 and is attached thereto by attaching ring 54 that, along with core 50, is conventional and is constructed as heretofore described in connection with FIGS. 1–6.

A coupling member 66 is attached to ring 54 and includes a generally cylindrical neck portion 68 having a flange 70 extending outwardly therefrom at one end of the coupling member. Preferably, coupling member 66 is a cylindrical metal member attached to attaching ring 54 and core 50 by welding, riveting or the like, in a manner to securely them, but not necessarily to form a seal.

Flange 70 of coupling member 66 is spaced above flange 56 of attaching ring 54 to form a sealing area 72.

A filter medium 74 comprises a web of filter material sealed at the top and bottom edges thereof to form a plurality of pockets, each adapted to receive one leaf of supporting frame 52.

Preferably, filter medium 74 is sealed at the top and bottom edges by parallel seams 76 that extend along the top of each pocket and join into a single seam at a neck portion of filter medium 74.

Figure 10:
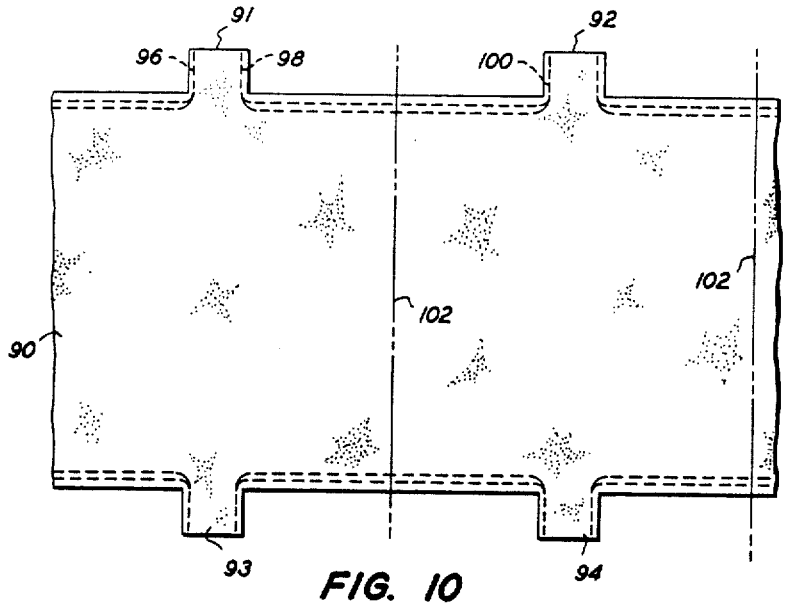
FIGS. 10 and 11 are side elevational views of a filter medium in accordance with this invention.
Figure 11:
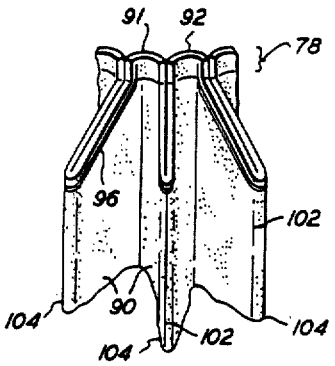

It is preferred, in accordance with this invention and as shown in FIGS. 10 and 11, to form filter medium 74 from an elongated web of filter material 90 having a plurality of spaced-apart tabs at the upper 91, 92 and lower 93, 94 edges thereof whereby the filter medium shown in FIG. 11 can be formed by folding the material along lines 102 to form bights between adjacent portions of the filter material. The filter medium is then sealed along the dotted lines as exemplified by lines 96, 98 and 100 at the top and bottom edges of such material and along adjacent side portions of adjoining tabs whereby a filter medium having a plurality of pockets 104 extending radially outwardly from upper 78 and lower (not shown) neck portions is provided.

A clamp 80, as seen in FIG. 7, holds neck portion 78 of filter medium 74 in sealing engagement with neck 68 of coupling member 66. A gasket 82 is preferably disposed on an upper surface of flange 70 when the filter assembly is in use.

It will be appreciated that the filter structure shown in FIG. 7 completely eliminates the problems heretofore discussed in connection with prior art filter constructions. Because gasket 82 is supported by coupling member 66 that is mechanically attached to core 50, deformation of frame 52 does not occur when the filter element in accordance with the invention is installed in a filter assembly. Sealing pressure is transmitted by coupling member 66 to core 50 that may be made sufficiently rigid to absorb such stress without significant deformation. Deformation of frame 52 is eliminated and the pressure drop across the filter is maintained at a constant level. Further, because clamp 80 provides a seal to coupling member 66 which does not rely on sewing or gluing a gasket to the filter medium, the necessity for providing flaps to form a sealing surface at each end of the filter element is eliminated and the flow of filtrate past the leaves of the filter element is greatly enhanced. Still further, the inherent tendency of the prior art construction to leak at the point where the gasket was attached to the filter element is completely eliminated.

A modification of the filter construction shown in FIG. 7 is illustrated at FIG. 8 wherein the construction is identical to that shown in FIG. 7, except that the filter medium is, in essence, turned inside out so that seams 76 are within the pockets formed in the filter medium, thereby providing a still further improvement in flow characteristics and reduction in back pressure.

A filter element in accordance with an alternative embodiment of this invention is illustrated at FIG. 9. A tubular central core 50, preferably formed of perforated metal, is provided. An attaching ring 54 is disposed at each end of core 50 for attaching frame 52 to the core. These elements are identical to those heretofore described in connection with the embodiments of this invention illustrated at FIGS. 7–8. A filter medium 74, identical in structure to the filter medium heretofore described, is carried by frame 52. The neck portion 86 of filter medium 74 is folded back over itself to form a U-shaped bight disposed on horizontal flange 56 of bracket 54. An inner sealing surface 84 of neck 86 is attached, by gluing, sewing or the like, to a gasket 82. A sealing plate 36 is employed to compress gasket 82 and folded-over neck portion 86 of sealing medium 74 between plate 36 and bracket 54.

It will be seen that this construction eliminates the deformation of frame 52 that was a problem in prior art filter constructions. Further, since a sealing surface 84 is provided that is radially inward of the top edges of the radially extending flaps of filter medium 74, the upper edges of such flaps need not be folded over and the flow between such flaps is greatly enhanced. Still further, the leakage path present in prior art constructions as shown in FIG. 4 is eliminated by this embodiment of the invention.

Preferably, the flaps are sealed by first and second spaced parallel seams that may be ultrasonically welded, sewn or the like, and which join into a single seam at neck portion 86 of filter medium 74.

While the invention has been shown in connection with certain presently preferred embodiments thereof, those skilled in the art will recognize that many modifications may be made therein without departing from the true spirit and scope of the invention which accordingly, is intended to be defined solely by the appended claims.

I claim:

1. A filter medium for a fluid filter element comprising;

a continuous elongated web of filter material having;

a plurality of spaced-apart tabs along at least one edge of said web;

at least *a* first [and second parallel seams] *seam* along said at least one edge [forming] *joining adjacent portions of said elongated web to form* a plurality of pockets[; at least one further seam] *and* joining adjacent edges of adjacent ones of said tabs, [said further seam intersecting at least one of said first and second parallel seams,] whereby said filter element includes;

a generally tubular central core having a neck portion at one end of said core and a plurality of pockets extending radially outwardly from said core.

2. The filter of claim 1 wherein said [seams are] *seam is* stitched.

3. The filter of claim 1 wherein said [seams are] *seam is* welded.

4. The filter of claim 1 wherein said [seams are] *seam is* within said pockets.

5. A fluid filter element comprising;

a substantially rigid perforated cylindrical core;

a filter medium supporting frame having a plurality of leaves extending radially outwardly from said core;

means attaching said frame to said core;

a coupling member attached at one end to said core and at the opposite end to a radially extending flange, said flange having a gasket receiving surface thereon, whereby sealing forces applied to said flange are transmitted to said core member and not to said filter medium supporting frame.

6. The filter element of claim 5 wherein said coupling member comprises a tubular body having a circumferential sealing surface and an annular flange sealingly attached at said opposite end.

7. The filter element of claim 6 further comprising a filter medium having an elongated tubular body having a generally cylindrical neck portion at each end thereof and a plurality of pockets extending radially outwardly from said body and attached to said body and at each end to said neck portions; [first] and [second seams] *a seam* on each of said pockets, said [seams] *seam* sealing said [pockets] *pocket* and sealing said [pockets] *pocket* to said neck [portions] *portion.*

8. A fluid filter comprising;

a substantially rigid core;

a filter medium supporting frame attached to said core;

a filter medium mounted on said supporting frame;

a coupling member attached to said core having a first sealing area for sealing to said medium and a second sealing area for making an external connection to said filter;

means for attaching said filter medium to said coupling member at said first sealing area.

9. The filter of claim 8 wherein said coupling member comprises a tubular body and an end flange attached to said body.

10. The filter of claim 9 wherein said first sealing area comprises an outer circumferential surface of said body.

11. The filter of claim 10 wherein said second sealing area comprises a flat surface portion of said flange.

12. The filter of claim 10 wherein said means attaching said filter medium to said coupling member comprises a band clamp.

13. In a filter element of the type including a substantially rigid tubular core, a supporting frame and first and second attaching clips, each *clip* having a core engaging portion and a frame engaging portion, said clips disposed at opposite ends of said core and engaging said core and said frame, the improvement for reducing leakage comprising:

a filter medium supported by said frame and having a generally cylindrical neck portion and a [U-shaped] *folded over* end portion; and gasket means engaging said end portion;

means for compressing said gasket means and said end portion into sealing engagement with said clip without exerting compressive forces on said frame.

* * * * *